United States Patent
Gao et al.

(10) Patent No.: US 11,496,690 B2
(45) Date of Patent: *Nov. 8, 2022

(54) EXPOSURE CHANGE CONTROL IN LOW LIGHT ENVIRONMENTS

(71) Applicant: Google LLC, Mountain View, CA (US)

(72) Inventors: Jinglun Gao, San Mateo, CA (US); Lin Lu, Taipei (TW); Gang Sun, San Jose, CA (US); Szepo Hung, Santa Clara, CA (US); Ruben Manuel Velarde, Chula Vista, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,816

(22) Filed: Sep. 16, 2021

(65) Prior Publication Data
US 2022/0006940 A1 Jan. 6, 2022

Related U.S. Application Data

(63) Continuation of application No. 16/684,947, filed on Nov. 15, 2019, now Pat. No. 11,159,737.

(60) Provisional application No. 62/914,759, filed on Oct. 14, 2019.

(51) Int. Cl.
*H04N 5/235* (2006.01)

(52) U.S. Cl.
CPC ......... *H04N 5/2353* (2013.01); *H04N 5/2351* (2013.01)

(58) Field of Classification Search
CPC .. H04N 5/2353; H04N 5/2351; H04N 5/2327; H04N 5/23254; H04N 5/23258; G03B 7/093; G03B 7/0997

See application file for complete search history.

(56) References Cited

U.S. PATENT DOCUMENTS

| | | | |
|---|---|---|---|
| 6,611,289 B1 | 8/2003 | Yu | |
| 6,900,840 B1 | 5/2005 | Schinner | |
| 9,129,549 B2 * | 9/2015 | Bell | G09G 3/20 |
| 9,544,574 B2 | 1/2017 | Geiss | |
| 10,230,888 B2 | 3/2019 | Lou | |
| 10,264,266 B2 | 4/2019 | Pan | |
| 10,469,723 B2 * | 11/2019 | Pincenti | H04N 5/2256 |
| 10,770,028 B2 | 9/2020 | Mese | |
| 11,159,737 B2 * | 10/2021 | Gao | H04N 5/2327 |
| 2011/0298886 A1 | 12/2011 | Price | |

(Continued)

FOREIGN PATENT DOCUMENTS

CN 107197164 A 9/2017

*Primary Examiner* — Luong T Nguyen
(74) *Attorney, Agent, or Firm* — McDonnell Boehnen Hulbert & Berghoff LLP (57) ABSTRACT

A method includes detecting, based on sensor data from a sensor on a mobile device, an environmental brightness measurement, where the mobile device comprises a display screen configured to adjust display brightness based on environmental brightness. The method further includes determining, based on image data from a camera on the mobile device, an extent to which the detected environmental brightness measurement is caused by reflected light from the display screen. The method additionally includes setting a rate of exposure change for the camera based on the determined extent to which the detected environmental brightness measurement is caused by reflected light from the display screen.

20 Claims, 7 Drawing Sheets

(56) References Cited

U.S. PATENT DOCUMENTS

| | | |
|---|---|---|
| 2012/0062754 A1 | 3/2012 | Huang |
| 2014/0320679 A1 | 10/2014 | Lammers |
| 2015/0358520 A1 | 12/2015 | Thimmappa |
| 2016/0301852 A1 | 10/2016 | Krishnamurthy Sagar |
| 2018/0063435 A1 | 3/2018 | Cho |
| 2018/0167579 A1 | 6/2018 | Breedvelt-Schouten |
| 2018/0181275 A1* | 6/2018 | Baek ................. G06F 3/147 |
| 2018/0220061 A1 | 8/2018 | Wang |
| 2018/0234604 A1 | 8/2018 | Ramsay |
| 2018/0278823 A1* | 9/2018 | Horesh ............. H04N 5/23251 |
| 2019/0012776 A1 | 1/2019 | Liu |
| 2019/0098196 A1 | 3/2019 | Bessou |

\* cited by examiner

EXPOSURE CHANGE CONTROL IN LOW LIGHT ENVIRONMENTS

CROSS-REFERENCE TO RELATED APPLICATION

The present disclosure claims priority to U.S. patent application Ser. No. 16/684,947, filed on Nov. 15, 2019, which claims priority to U.S. Provisional Patent Application No. 62/914,759, filed on Oct. 14, 2019, the entire contents of which are herein incorporated by reference as if fully set forth in this description.

BACKGROUND

Many modern computing devices, such as mobile phones, personal computers, and tablets, include image capture devices, such as still and/or video cameras. The image capture devices can capture images, such as images that include people, animals, landscapes, and/or objects.

Exposure refers to an amount of light per unit area reaching an electronic image sensor, as determined by one or more exposure parameters such as shutter speed, lens aperture, and scene luminance. By automatically adjusting exposure, an image capture device may improve the quality of generated images.

SUMMARY

The present disclosure involves methods that combine sensor data from multiple input sources to control the change of exposure of a camera to improve the quality of captured frames in representing a scene.

In a first aspect, a method is provided. The method includes detecting, based on sensor data from a sensor on a mobile device, an environmental brightness measurement, where the mobile device comprises a display screen configured to adjust display brightness based on environmental brightness. The method further includes determining, based on image data from a camera on the mobile device, an extent to which the detected environmental brightness measurement is caused by reflected light from the display screen. The method additionally includes setting a rate of exposure change for the camera based on the determined extent to which the detected environmental brightness measurement is caused by reflected light from the display screen.

In a second aspect, a mobile device is provided, including a display screen configured to adjust display brightness based on environmental brightness, an ambient light sensor, a camera, and a control system. The control system may be configured to detect, based on sensor data from the ambient light sensor, an environmental brightness measurement. The control system may additionally be configured to determine, based on image data from the camera, an extent to which the detected environmental brightness measurement is caused by reflected light from the display screen. The control system may be further configured to set a rate of exposure change for the camera based on the determined extent to which the detected environmental brightness measurement is caused by reflected light from the display screen.

In a third aspect, a non-transitory computer-readable medium is provided including program instructions executable by one or more processors to cause the one or more processors to perform operations. The operations include detecting, based on sensor data from a sensor on a mobile device, an environmental brightness measurement, wherein the mobile device comprises a display screen configured to adjust display brightness based on environmental brightness. The operations further include determining, based on image data from a camera on the mobile device, an extent to which the detected environmental brightness measurement is caused by reflected light from the display screen. The operations additionally include setting a rate of exposure change for the camera based on the determined extent to which the detected environmental brightness measurement is caused by reflected light from the display screen.

In a fourth aspect, a system is provided that includes means for detecting, based on sensor data from a sensor on a mobile device, an environmental brightness measurement, wherein the mobile device comprises a display screen configured to adjust display brightness based on environmental brightness. The system further includes means for determining, based on image data from a camera on the mobile device, an extent to which the detected environmental brightness measurement is caused by reflected light from the display screen. The system additionally includes means for setting a rate of exposure change for the camera based on the determined extent to which the detected environmental brightness measurement is caused by reflected light from the display screen.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Exposure control for a camera of a mobile device such as a smartphone can determine the brightness of captured frames. The mobile device may also include a preview mode during image capture which allows a user to observe changes in brightness on a display screen of the mobile device. Such changes in brightness may result from scene changes and/or other factors.

In some examples, a display screen of the mobile device may leverage an ambient light sensor to detect environment brightness. The ambient light sensor may take the form of a spectral sensor, which is a combination sensor which can detect both flicker and light spectrum, but is equivalent to an ambient light sensor when dedicated to use light spectrum. The ambient light sensor may be a rear-facing sensor located on a rear side of the mobile device, on the opposite side from the display. If the environment that the ambient light sensor is facing is too bright, then the display screen may be configured to become brighter to make the view more appropriate, and vice versa. On the front side of the mobile device, on the same side as the display, the camera may be configured to control the camera sensor for exposure sensitivity. If a captured frame is too dark, then the camera control may increase exposure sensitivity to make the frame brighter, and vice versa. In further examples, the ambient light sensor and the camera may both point in the same direction (e.g., both rear-facing) as long as the ambient light sensor is facing away from the display.

Usually the two strategies can work together to make a good selfie photo experience, but in certain cases such as low light environments, some conflicts between the two approaches may occur. When a user takes selfie photos using a front-facing camera, the screen demonstrates the preview of the selfie capture. Assuming at first the captured frame is too dark, the camera control may be configured to increase the camera sensor exposure sensitivity to make the user's face brighter. The preview on the display screen which captures the face will then become brighter, which causes the user's face that reflects the display light to become brighter.

If the display is the major light source (e.g., when the user is in a relatively dark environment), then since the ambient light sensor can sense the reflected light from the user's face become brighter, the display will become brighter due to the display's own strategy for adjusting based on environmental brightness. When the display becomes brighter, the user's face that reflects the display light will become brighter, and then the captured frame will be even brighter. This iteration will continue until the camera control determines that the captured frame is too bright. The camera control may then decrease the camera sensor sensitivity, and due to the decrease of the image brightness, both exposure sensitivity and the display brightness will decrease until the captured frame becomes too dark. This loop may be referred to as exposure oscillation in such cases. The visual effect of exposure oscillation may involve a preview image alternating between too bright and too dark multiple times, which may create a less than optimal display experience.

To avoid this behavior, one approach involves decreasing the rate of exposure change (e.g., by decreasing the magnitude of exposure change steps). Accordingly, when the exposure reaches an acceptable exposure range, the camera control can stop updating the exposure in time to prevent exposure oscillation. However, on the other hand, the exposure change may need to occur fast enough to catch real scene changes.

Examples described herein involve understanding the scene and detecting if scene changes are caused by the display light or by other factors. The examples further involve controlling the rate of exposure change based on the extent to which environmental brightness measurements are the result of reflected light from the display screen. More specifically, examples described herein may involve using a rear-facing ambient light sensor to detect changes in environmental light, and using a front-facing camera to evaluate motion and luma changes to determine if scene changes are caused by motion (which necessitates a fast exposure change) or by display changes (which necessitates a slow exposure change).

II. Example Devices

Figure 1:
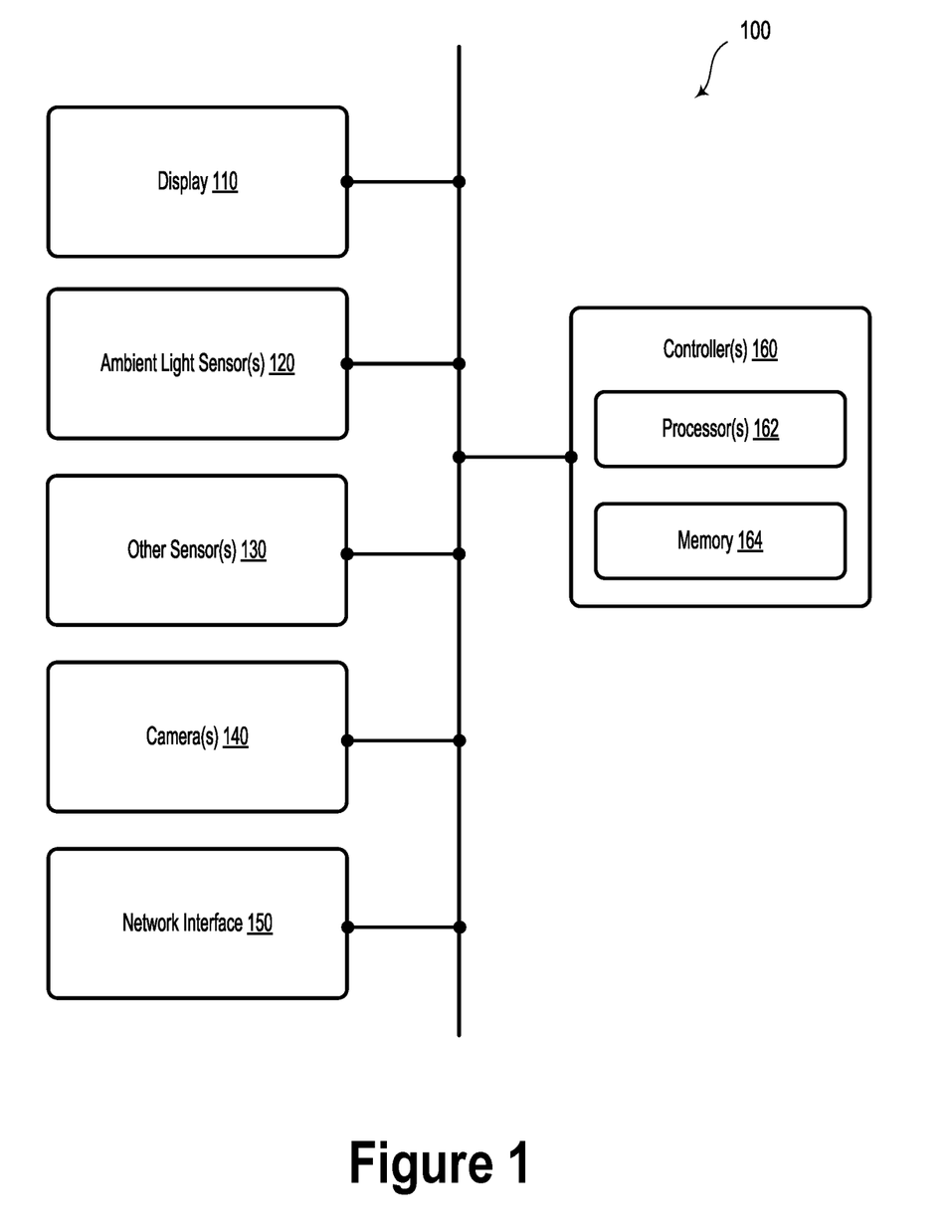
FIG. 1 illustrates a computing device, in accordance with example embodiments.

FIG. 1 illustrates computing device 100, in accordance with example embodiments. Computing device 100 includes display 110, one or more ambient light sensors 120, one or more other sensors 130, one or more cameras 140, network interface 150, and one or more controllers 160. In some examples, computing device 100 may take the form of a mobile computing device, such as a smartphone, a tablet device, a camera, or a wearable device. Computing device 100 may be configured to interact with an environment. For example, computing device 100 may obtain image data indicative of an environment around computing device 100, and may also obtain environmental state measurements associated with the environment such as ambient light measurements.

Display 110 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display 110 may also be configured to generate audible outputs, such as with a speaker, speaker jack, audio output port, audio output device, earphones, and/or other similar devices. Display 110 may further be configured with one or more haptic components that can generate haptic outputs, such as vibrations and/or other outputs detectable by touch and/or physical contact with computing device 100.

Display 110 may be configured to provide visual output at a given brightness level. The brightness level may be determined as a percentage of a maximum brightness level. In some examples, display 110 may be configured to automatically adjust its brightness level based on environmental brightness and/or other factors. A user input mechanism such as a slider mechanism may be provided to allow a user to adjust screen brightness in some examples as well.

Ambient light sensor(s) 120 may be configured to receive light from an environment of (e.g., within 1 meter (m), 5 m, or 10 m of) computing device 100. Ambient light sensor(s) 120 may include at least one rear-facing ambient light sensor on computing device 100. Ambient light sensor(s) 120 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 120 may include indium gallium arsenide (In-GaAs) APDs configured to detect light at wavelengths around 1550 nanometers (nm). Other types of ambient light sensor(s) 120 are possible and contemplated herein.

In some embodiments, ambient light sensor(s) 120 may include a plurality of photodetector elements disposed in a one-dimensional array or a two-dimensional array. For example, ambient light sensor(s) 120 may include sixteen detector elements arranged in a single column (e.g., a linear array). The detector elements could be arranged along, or could be at least parallel to, a primary axis.

In some embodiments, computing device 100 can include one or more other sensors 130. Other sensor(s) 130 can be configured to measure conditions within computing device 100 and/or conditions in an environment of (e.g., within 1 m, 5 m, or 10 m of) computing device 100 and provide data about these conditions. For example, other sensor(s) 130 can include one or more of: (i) sensors for obtaining data about computing device 100, such as, but not limited to, a thermometer for measuring a temperature of computing device 100, a battery sensor for measuring power of one or more batteries of computing device 100, and/or other sensors measuring conditions of computing device 100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 100, such as, but not limited to, a tilt sensor, a gyroscope, an accelerometer, a Doppler sensor, a Global Positioning System (GPS) device, a sonar sensor, a radar device, a laser-displacement sensor, and/or a compass; (iv) an environmental sensor to obtain data indicative of an environment of computing device 100, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; and/or (v) a force sensor to measure one or more forces (e.g., inertial forces and/or G-forces) acting about computing device 100, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 130 are possible as well.

Camera(s) 140 may be configured to capture image and/or video data. Camera(s) 140 may include at least one front-facing camera on computing device 100. Camera(s) 140 may include one or more lenses, lens motors, light sensors, hardware processors, and/or software for utilizing hardware of camera(s) 140 and/or for communicating with controller(s) 160. Camera(s) 140 may be configured to automatically adjust exposure based on environmental lighting and/or other factors. For example, an automatic exposure function can be used to set an aperture of a lens of the camera, analog and/or digital gain of the camera, and/or a shutter speed of the camera prior to or during image capture. Image data from camera(s) 140 may be provided for display on display 110 in the form of a video camera preview mode.

Data gathered from ambient light sensors(s) 120, other sensor(s) 130, and/or camera(s) 140 may be communicated to controller(s) 160, which may use the data to adjust operation of display 110 and/or camera(s) 140, as further described herein.

Network interface 150 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 150 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 160 may include one or more processors 162 and memory 164. Processor(s) 162 can include one or more general purpose processors and/or one or more special purpose processors (e.g., digital signal processors (DSPs), tensor processing units (TPUs), graphics processing units (GPUs), application specific integrated circuits (ASICs), etc.). Processor(s) 162 may be configured to execute computer-readable instructions that are contained in memory 164 and/or other instructions as described herein. Memory 164 may include one or more non-transitory computer-readable storage media that can be read and/or accessed by processor(s) 162. The one or more non-transitory computer-readable storage media can include volatile and/or non-volatile storage components, such as optical, magnetic, organic or other memory or disc storage, which can be integrated in whole or in part with at least one of processor(s) 162. In some examples, memory 164 can be implemented using a single physical device (e.g., one optical, magnetic, organic or other memory or disc storage unit), while in other examples, memory 164 can be implemented using two or more physical devices.

In example embodiments, processor(s) 162 are configured to execute instructions stored in memory 164 so as to carry out operations as described herein. Notably, different operations may be executed by individual controllers of controller(s) 160. In particular, controller(s) 160 may include one or more controllers integrated with display 110 and/or one or more controllers integrated with camera(s) 140, in addition to or instead of one or more separate controllers.

III. Example Methods

Figure 2:
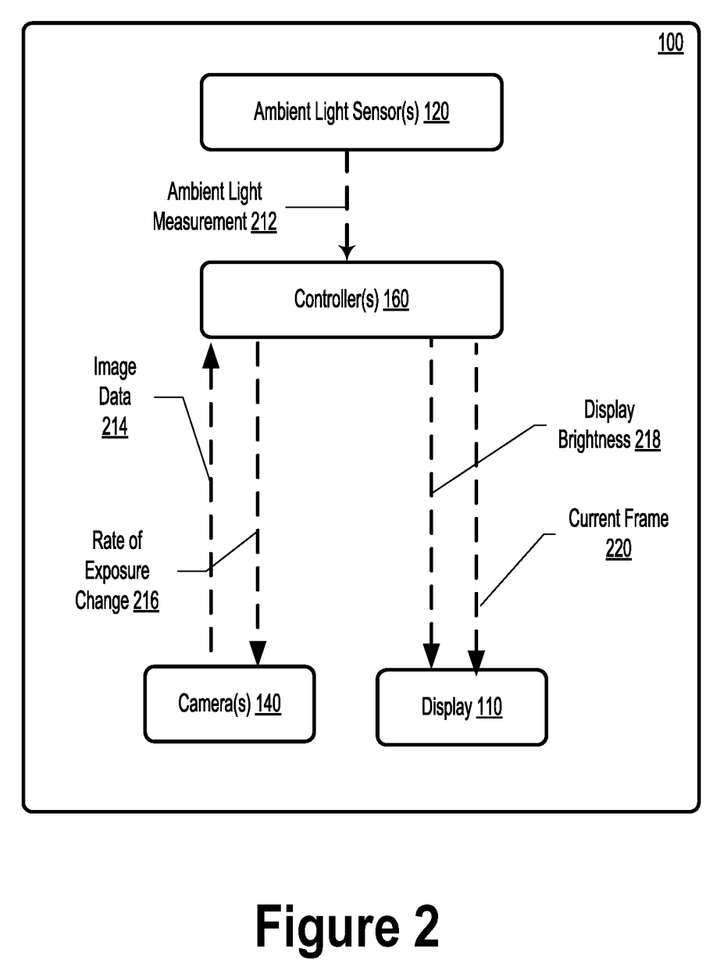
FIG. 2 illustrates data flow between components of a computing device, in accordance with example embodiments.

FIG. 2 illustrates data flow between components of a computing device, in accordance with example embodiments. More specifically, components of computing device 100, including ambient light sensor(s) 120, controller(s) 160, camera(s) 140, and display 110 may communicate with each other as illustrated. The computing device 100 illustrated in FIG. 2 may operate in and interact with an environment surrounding computing device 100. The environment may include one or more light sources that light up the environment, such as light from natural or artificial light sources or light reflected off of objects in the environment, among other light sources.

Ambient light sensor(s) 120 may be optically-coupled to the surrounding environment. That is, the arrangement of ambient light sensor(s) 120 within computing device 100 may enable ambient light sensor(s) 120 to detect one or more light sources from a field of view of the surrounding environment. In some examples, ambient light sensor(s) 120 may capture the magnitude of one or more light sources so as to produce ambient light measurement 212. Then, ambient light measurement 212 may be communicated by ambient light sensor(s) 120 to controller(s) 160. Based on the value of ambient light measurement 212, controller(s) 160 may adjust the behavior of display 110 and/or camera(s) 140.

Camera(s) 140 may capture image data 214, including still and/or video images of the environment surrounding computing device 100. Brightness of the images may be influenced by a current exposure of the camera(s) 140. The camera(s) 140 may be configured to automatically set the exposure of camera(s) 140 in order to achieve a desired brightness level (e.g., a brightness level selected for optimal image quality independent of the current environment in which the image is being viewed). The exposure may be adjusted based on previously captured frames until an optimal exposure is reached. Camera(s) 140 may communicate image data 214 to controller(s) 160.

Controller(s) 160 may set a rate of exposure change 216 for camera(s) 140 to influence the rate at which exposure adjustments are made by camera(s) 140. The rate of exposure change 216 may depend both on the ambient light measurement 212 from ambient light sensor(s) 120 and on image data 214 from camera(s). In some scenarios, controller(s) 160 may determine that the environment is relatively low light and the mobile device 100 is stable. Consequently, controller(s) 160 may determine that the ambient light measurement 212 primarily results from light from display 110 which has reflected off surfaces in the environment, such as a user's face. Controller(s) 160 may then decrease the rate of exposure change 216 to prevent exposure oscillation. In other scenarios, controller(s) 160 may determine that the environment is relatively bright, and therefore may refrain from decreasing the rate of exposure change 216. In further scenarios, controller(s) 160 may determine that the mobile device 100 and/or the surrounding environment are in motion, and therefore may also refrain from decreasing the rate of exposure change 216.

Notably, exposure oscillation may be a particularly significant issue in computing devices where the display is already configured to adjust display brightness based on environmental brightness. In reference to FIG. 2, controller(s) 160 may be configured to adjust display brightness 218 of display 110. When the surrounding environment is darker, display brightness 218 may be decreased. When the surrounding environment is brighter, display brightness 218 may be increased. Adjustment of display brightness based on surrounding environment brightness may be performed using ambient light measurement 212 from ambient light sensor(s) 120.

Controller(s) 160 may also communicate a current frame 220 captured by camera(s) 140 for display on display 110. Current frame 220 may be displayed on display 110 as part of a video preview mode. The brightness of current frame 220 on display 110 may be influenced both by the current brightness level of the display 110 and by the current exposure of camera(s) 140. Consequently, competing feedback loops of the display 110 and the camera(s) 140 may cause exposure oscillation in some scenarios. By reducing the rate of exposure change 216, the display brightness may be allowed to converge while reducing or eliminating exposure oscillation.

While FIG. 2 illustrates a particular arrangement of elements, other arrangements are possible. Additionally or alternatively, some elements of computing device 100 may be added, removed, combined, and/or rearranged.

Figure 3:
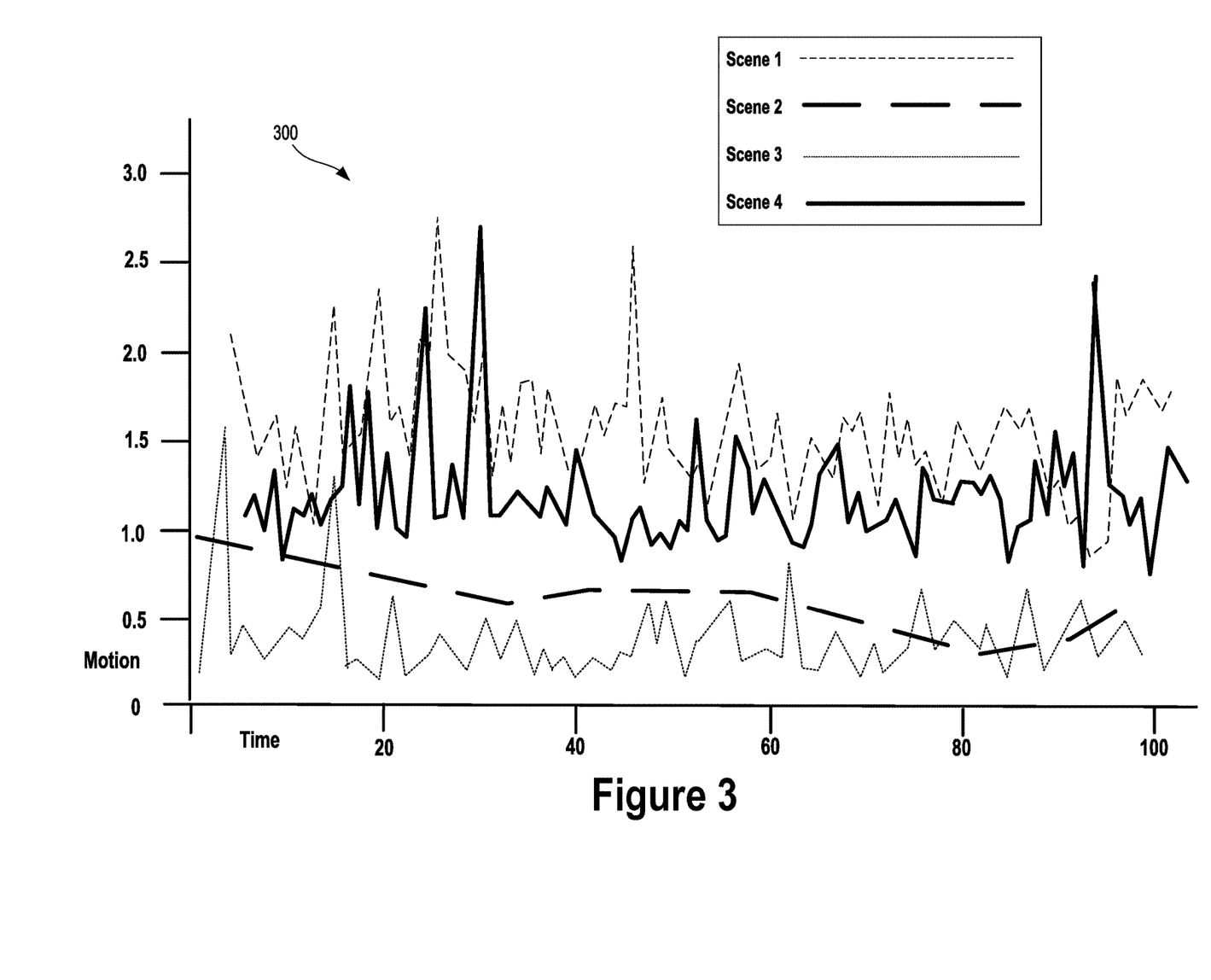
FIG. 3 depicts a graph illustrating motion information for different scenes, in accordance with example embodiments.

FIG. 3 depicts a graph illustrating motion information for different scenes, in accordance with example embodiments. More specifically, motion plots 300 over time for four different scenes are illustrated. In some examples, motion information determined from image data captured by a camera may be used to determine whether or not to adjust the exposure rate of the camera for different encountered scenes.

Motion information may be considered as part of a multi-sensor input fusion process to make a decision about whether to trigger a slow down in the rate of exposure change of a camera (a slow down rate). In some examples, the multi-sensor input may include using at least data collected from (1) a rear-facing ambient light sensor and (2) a front-facing camera to detect scene change characteristics. The rear-facing ambient light sensor can sense if the environment is a dark scene, and it can detect reflected light from the display screen (excluding the display screen itself). The front-facing camera can capture a selfie frame and use that image data to compute motion and luma change, which can be used to further determine scene change characteristics.

As a first step, the ambient light sensor may be used to detect environmental brightness. In this case, environmental brightness refers to an attribute associated with the environment radiating and/or reflecting light (as distinguished, for instance, from brightness associated with sound). This step may involve collecting ambient light sensor data from the ambient light sensor. In some examples, a green channel indicative of green light responsivity may be used to compute a luma value from the ambient light sensor data. In further examples, a green/clear channel indicative of a ratio of green responsivity to clear responsivity may be used to compute a luma value from the ambient light sensor data. If the luma value is determined to be high (e.g., exceeding a high luma threshold), then the environment may be identified as a bright scene and exposure convergence may be controlled to happen quickly.

As a second step, a front-facing camera may be used to detect scene changes. In some examples, this step may involve computing scene motion by comparing sequential frames in the image data. This step may be performed to distinguish real motion from display brightness changes. In some examples, motion mean over a time window may be considered to distinguish real motion from display brightness changes. In further examples, motion variance over a time window may be considered to distinguish real motion from display brightness changes as well or instead. In general, higher motion mean and/or higher motion variance are more likely to be associated with real device and/or scene motion that may require a fast exposure change.

In reference to FIG. 3, motion plots 300 illustrate motion information for four different scenes. The motion information may be normalized to a single scale (in this case, between 0.0 and 3.0, shown in the y-axis) and may represent a magnitude of motion based changes in the image data over a time window (measured, for instance, in milliseconds, and shown in the x-axis). In the examples illustrated in FIG. 3, it can be determined that scenes 1 and 4 represent real motion because they have larger motion means and high variance. By contrast, scenes 2 and 3 have relatively low motion mean and variance. It can be determined that the motion in scenes 2 and 3 is instead due to display screen brightness change.

Because motion computing tries to remove the effects of brightness change, luma change in the image data may also be evaluated as well or instead. Luma change may be determined by computing luma values representing brightness, for instance, based on a weighted sum of the red, green, and blue intensity values of individual pixels. Real motion is more likely to cause the luma values to change randomly, while the luma change due to display screen brightness change is more likely to be monotonic. In some examples, both the motion change and the luma change over time may be considered in combination to differentiate scene changes caused by real motion and scene changes caused by display brightness changes.

In general, multiple features may be combined to evaluate the extent to which environmental brightness measurements are caused by reflected light from the display, which may indicate a need to reduce the rate of exposure change. Different features may be used while other features may be omitted in further examples. In additional examples, different types of sensor data may be used as well or instead. In some examples (particularly where the ambient light sensor and the camera both point away from the display), light spectrum data from the ambient light sensor can be used to determine if the light the ambient light sensor receives is from an environment light source or a user's face reflecting the display light.

In further examples, sensor data from a gyroscope may be used to evaluate device motion in addition to or instead of camera image data. It may be advantageous to use both a gyroscope and image-based motion detection because a gyroscope provides a measurement of global motion while image-based motion detection provides a measurement of local motion. If sensor data from a gyroscope is used, then a control system may refrain from decreasing the rate of exposure change when the gyroscope indicates a significant amount of device motion (e.g., above a high threshold level).

Figure 4:
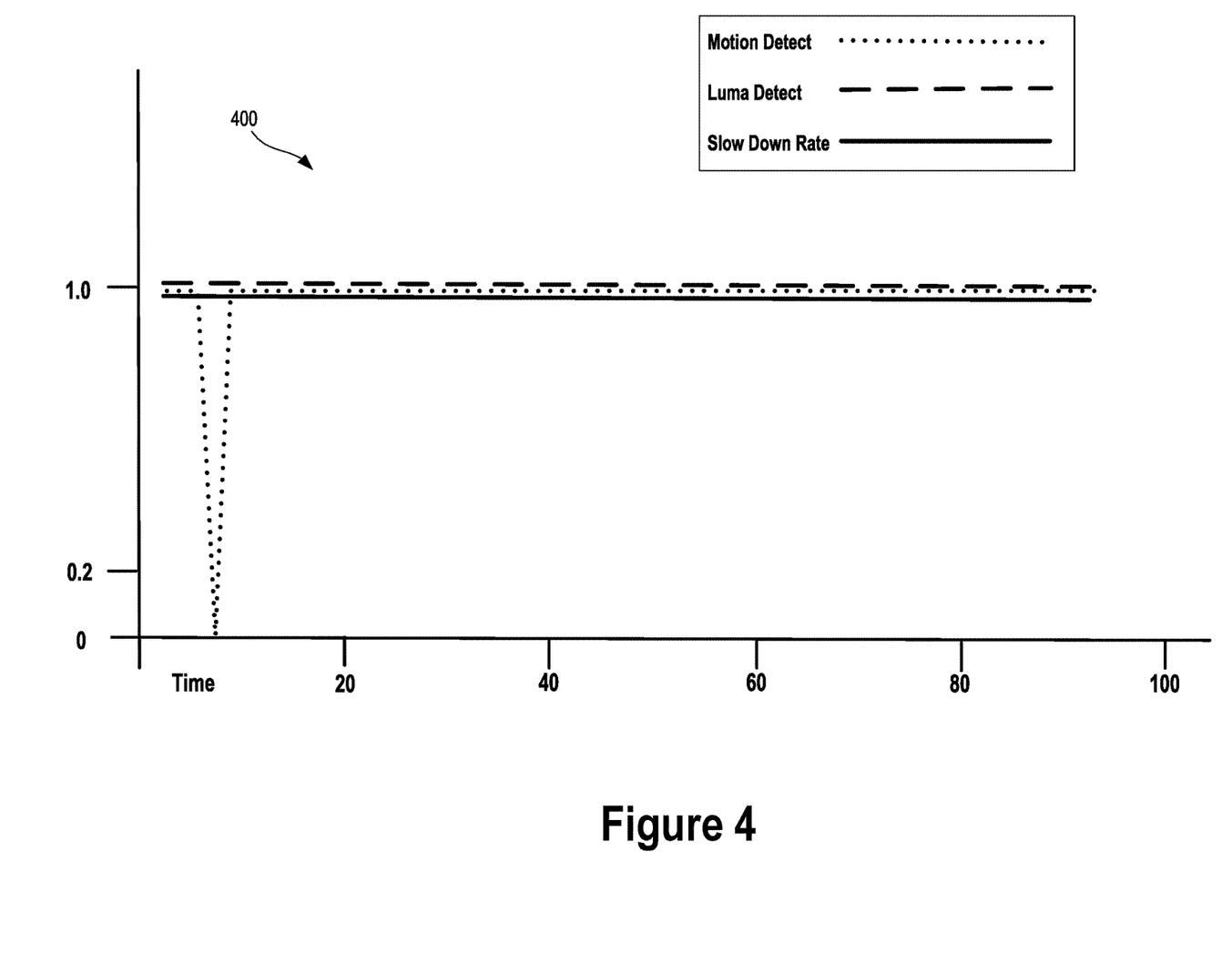
FIG. 4 depicts a graph illustrating a slow down rate determined for a first scene, in accordance with example embodiments.
Figure 5:
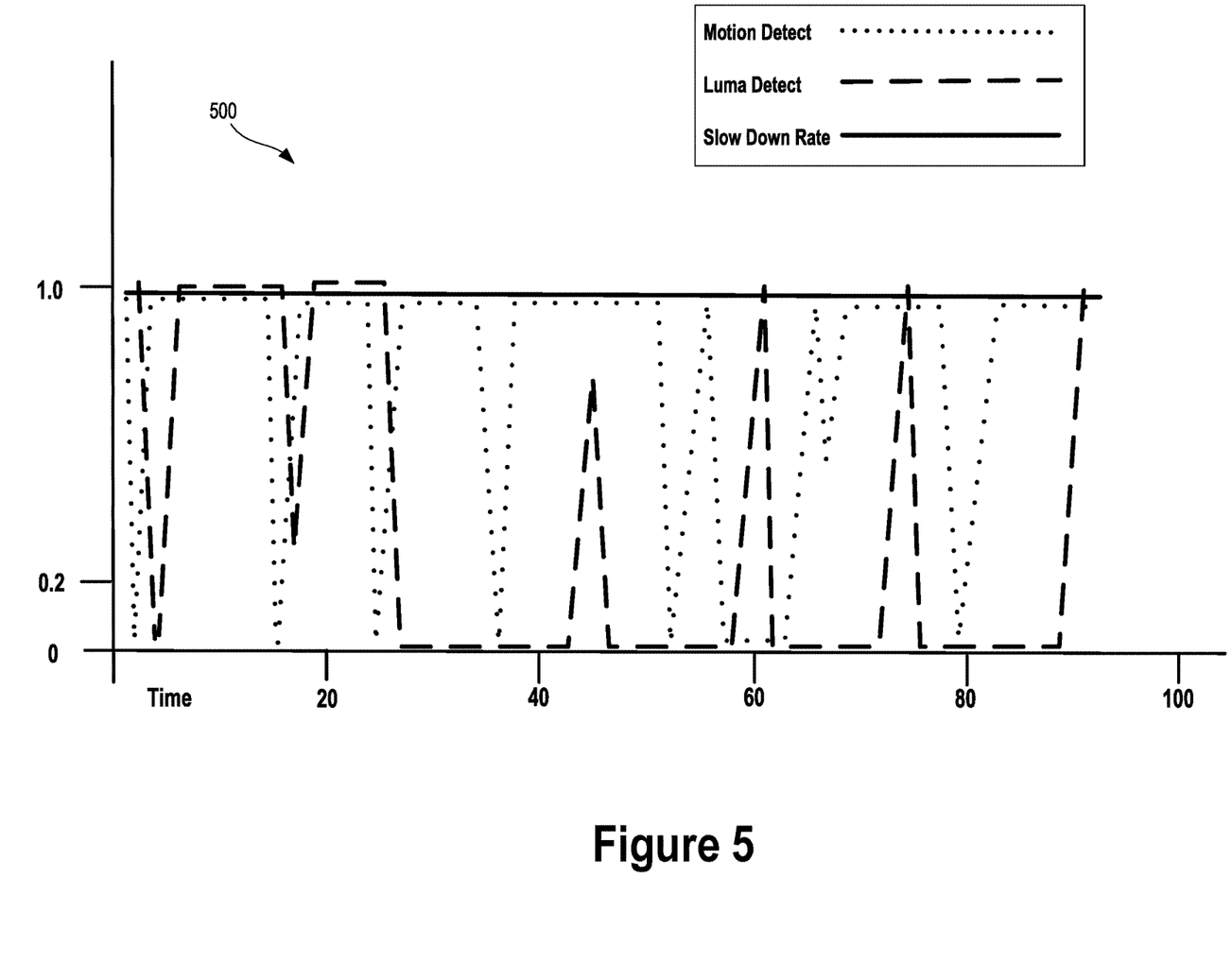
FIG. 5 depicts a graph illustrating a slow down rate determined for a second scene, in accordance with example embodiments.
Figure 6:
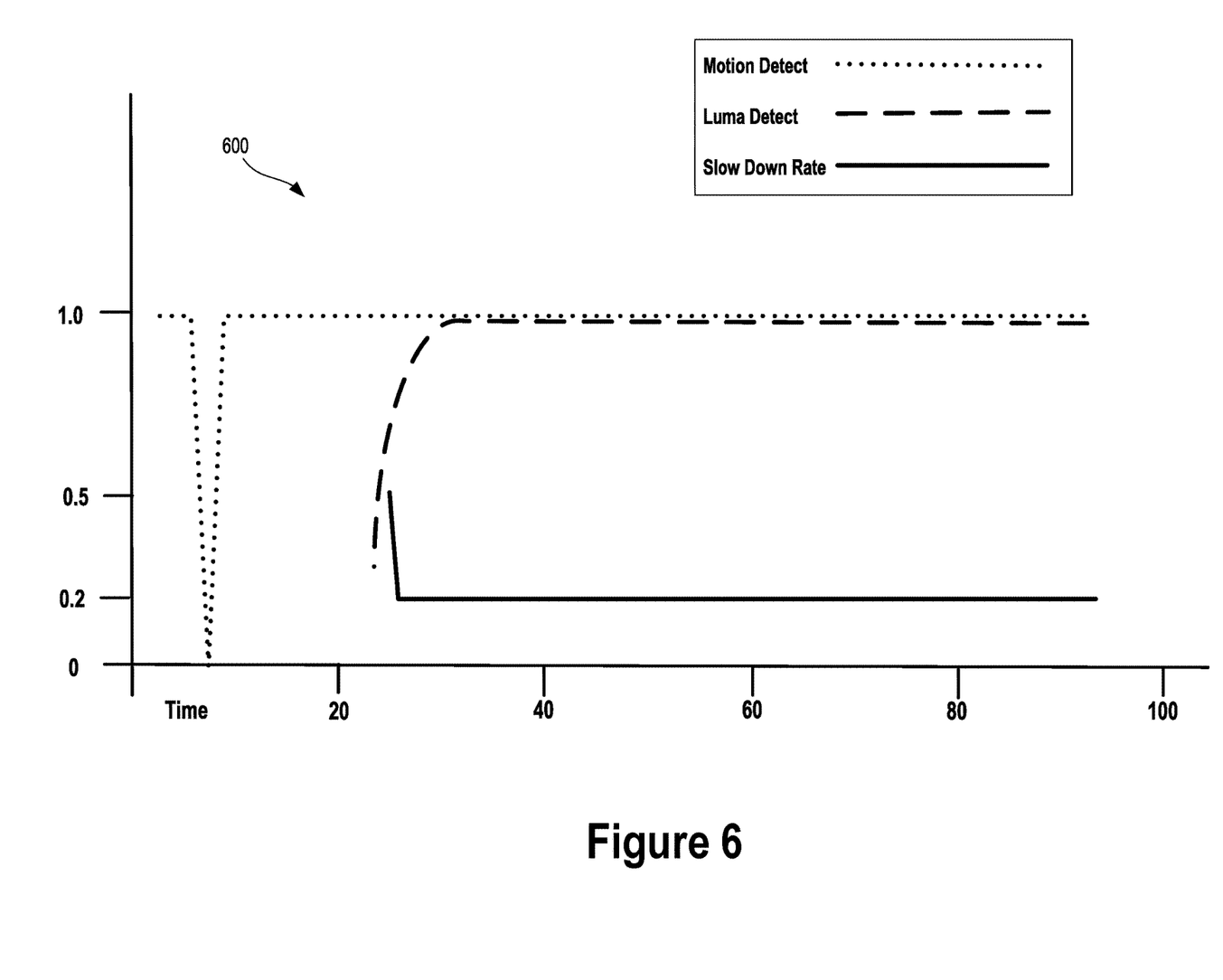
FIG. 6 depicts a graph illustrating a slow down rate determined for a third scene, in accordance with example embodiments.

FIGS. 4, 5, and 6 depict graphs illustrating slow down rates determined for different scenes, in accordance with example embodiments. Each figure illustrates an example relationship between slow down rate, luma detection, and motion detection over a time window for a different scene that may be encountered by a mobile device. A controller of the mobile device may be configured to set the slow down rate for camera exposure convergence based on detected luma and motion information in accordance with each of FIGS. 4, 5, and 6.

For illustration purposes, the slow down rate, luma detection, and motion detection are each scaled to a value between 0 and 1 in each of FIGS. 4, 5, and 6, shown in the y-axis. The slow down rate represents a multiplier that will affect the final convergence speed for camera exposure. The multiplier may be multiplied by a predefined constant already used by the camera to smooth convergence. For instance, if the slow down rate is 0.5 and the predefined constant is 0.8, then the final convergence speed may be equal to 0.5×0.8, i.e. 0.4. This convergence speed may indicate that the camera only compensates for underexposure or overexposure by 40% in each convergence step to gradually reach a final target exposure level. In some examples, the frequency of exposure change may be adjusted as well or instead of the magnitude.

The luma detection may also be scaled to a value between 0 and 1, where a value of 0 corresponds to a backside luma lower than a predetermined low threshold and a value of 1 corresponds to a backside luma higher than a predetermined high threshold. Additionally, the motion detection may also be scaled to a value between 0 and 1, where a value of 0 indicates instability and a value of 1 indicates stability. In some examples, the motion detection value may be based on image analysis over time. In other examples, the motion detection value may be based on gyroscope data as well or instead. The luma detection and motion detection may be measured over a time window (e.g., in milliseconds), shown in the x-axis.

In reference to FIG. 4, a plot 400 of slow down rate over time is illustrated for a first scene with associated luma and motion detection values. As illustrated, a motion detection value of 1 over most of the time window indicates that the device is relatively stable. Moreover, a luma detection value of 1 over the time window indicates that the environment is relatively bright. For a bright environment, exposure oscillation is not a major issue because reflected light from the display will not be the primary source of ambient light detected by the ambient light sensor. Accordingly, the slow down rate is set to a value of 1, indicated that a slow down of exposure convergence is not triggered in this case. Instead, the exposure of the camera is allowed to converge at a predetermined convergence rate without any reduction. This scenario may correspond to a scenario where a user is stationary and looking at his or her phone in a bright environment.

In reference to FIG. 5, a plot 500 of slow down rate over time is illustrated for a second scene with associated luma and motion detection values. As illustrated, the luma detection value varies between 0 and 1 over the time window indicating that there are time periods in which the ambient light sensor indicates a low light environment. Moreover, the motion detection value also varies significantly between 0 and 1 over the time window indicating that the mobile device and/or the scene are moving significantly over the time window. Although the luma detection value indicates a low level of ambient light for some times over the time window (which could indicate that exposure oscillation may be an issue), the motion detection value indicates that motion is likely the primary contributor to the ambient light measurements. Accordingly, the slow down rate is set to a value 1, indicated that a slow down of exposure convergence is also not triggered in this case. Instead, the exposure of the camera is allowed to converge at a predetermined convergence rate without any reduction. This scenario may correspond to a scenario where a user is moving through an environment while looking at his or her phone. A high rate of exposure convergence may be desirable in such a scenario.

In reference to FIG. 6, a plot 600 of slow down rate over time is illustrated for a third scene with associated luma and motion detection values. As illustrated, a motion detection value of 1 over most of the time window indicates that the device is relatively stable. Moreover, an initial luma detection value well below 1 indicates that the environment is relatively low light. For a low light environment when the mobile device is stable, exposure oscillation is potentially a significant issue because reflected light from the display may be the primary source of ambient light detected by the ambient light sensor. Accordingly, the slow down rate is reduced from a starting value of 0.5 to a value of 0.2, indicated that a slow down of exposure convergence is triggered in this case. The exposure of the camera is only allowed to converge at 20% of the predetermined convergence rate in order to combat exposure oscillation. This scenario may correspond to a scenario where a user activates the camera of a mobile device in a relatively low light environment while the mobile device is stable. The exposure convergence rate may be decreased by other factors or at a more gradual pace in other examples. In further examples, adjustment of the exposure convergence rate may be dynamic over a time window. More nuanced methods of adjusting the exposure convergence rate may also be used, such as by applying a trained machine learning model.

Figure 7:
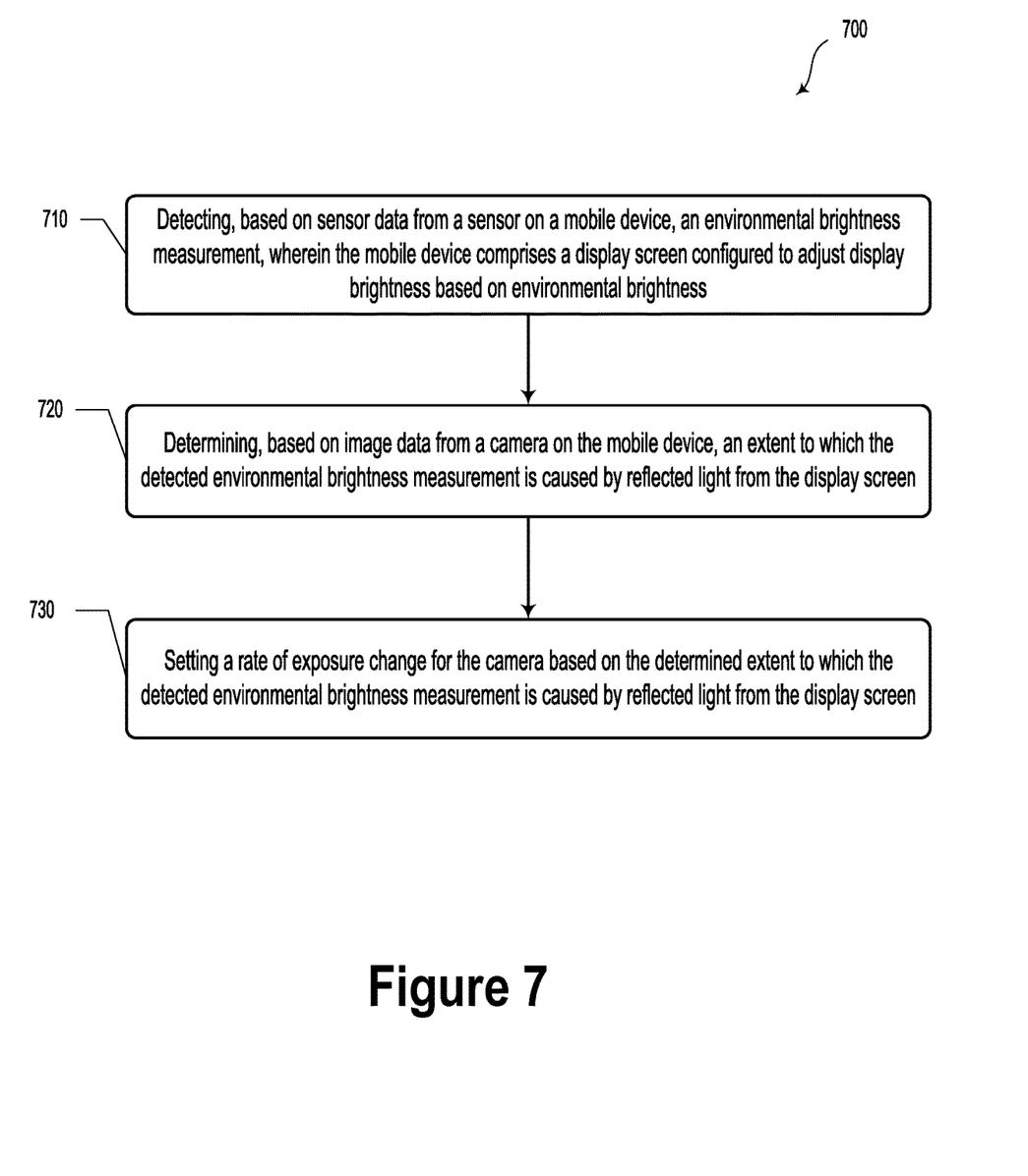
FIG. 7 illustrates a method, in accordance with example embodiments.

FIG. 7 illustrates a method 700, in accordance with example embodiments. Method 700 may include various blocks or steps. The blocks or steps may be carried out individually or in combination. The blocks or steps may be carried out in any order and/or in series or in parallel. Further, blocks or steps may be omitted or added to method 700.

The blocks of method 700 may be carried out by various elements of computing device 100 as illustrated and described in reference to FIGS. 1 and 2. In further examples, some or all of the blocks of method 700 may be carried out by a remote computing device or split across multiple computing devices. Furthermore, method 700 may operate as illustrated by plots 400, 500, and 600 in FIGS. 4, 5, and 6.

Block 710 includes detecting an environmental brightness measurement. The environmental brightness measurement may be based on sensor data from a sensor on a mobile device. In some examples, the sensor may be an ambient light sensor, for example a spectral sensor dedicated to use light spectrum measurements. In some examples, the sensor may be rear-facing on the mobile device. The mobile device may include a display screen configured to adjust display brightness based on environmental brightness. In some examples, the display screen may adjust display brightness based on the same ambient light sensor on the mobile device. Detecting the environmental brightness measurement may involve using a green channel indicative of green light responsivity in ambient light sensor data to determine a luma value. Detecting the environmental brightness measurement may also involve using a green/clear channel comprising a ratio of green responsivity to clear responsivity of ambient light sensor data to determine a luma value.

Block 720 includes determining an extent to which the detected environmental brightness measurement is caused by reflected light from the display interface. This determination may be based on image data from a camera on the mobile device. In some examples, the camera may be front-facing on the mobile device (e.g., pointing in the opposite direction of an ambient light sensor). Evaluating the image data may involve determining an extent to which the environmental brightness measurement is caused by motion in the image data. More specifically, motion between sequential frames in the image data may be evaluated (e.g., by measuring pixel motion across frames). Evaluating motion in the image data may further involve determining a motion mean and/or motion variance over a time window.

Determining the extent to which the detected environmental brightness measurement is caused by reflected light from the display screen may further involve evaluating luma change in the image data. More specifically, monotonic luma change may be associated with the environmental brightness measurement resulting from reflected light from the display screen.

Block 730 includes setting a rate of exposure change for the camera based on the determined extent to which the detected environmental brightness measurement is caused by reflected light from the display screen. Setting the rate of exposure change of the camera may involve decreasing the rate of exposure change of the camera when the environmental brightness measurement is determined to primarily result from reflected light from the display screen. When the rate of exposure change for the camera is to be decreased, a slow down rate may be determined. Setting the rate of exposure change of the camera may involve adjusting a magnitude of exposure changes by a factor of the slow down rate.

Setting the rate of exposure change of the camera may further involve increasing or maintaining the rate of exposure change of the camera when the environmental brightness measurement is determined to primarily result from motion in the image data and/or motion of the mobile device. In some examples, motion of the mobile device is determined using a gyroscope. Setting the rate of exposure change of the camera may also involve increasing or maintaining the rate of exposure change of the camera when the environmental brightness measurement is above a threshold brightness level.

In some examples, frames of the image data captured by the camera are displayed on the display screen. In further examples, the image data may include one or more images of a user of the mobile device (e.g., selfies). In other examples, the rate of exposure change of a camera may be aligned to a different uncalibrated light source, such as a flickering screen of a nearby computer that is separate from the computing device housing the camera.

In some examples, method 700 of FIG. 7 may be performed on a mobile device that is already configured to continuously collect ambient light sensor data and image data that may be used for motion detection. Accordingly, no additional cost may be incurred in terms of sensor data collection in order to perform the method 700 of FIG. 7 in order to reduce or eliminate the effect of undesirable exposure oscillation.

With respect to any examples described herein that may involve image data or other information of a user, a user may be provided with controls allowing the user to make an election as to both if and when systems, programs, or features described herein may enable collection and/or storing of user images or other information (e.g., information about a user's social network, social actions, or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, as well as what information is provided to the user.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
displaying, by a display screen of a camera of a mobile device, a preview of an image;
determining whether a perceived scene change in the preview is caused at least in part by an environmental reflection of light from the display screen; and
adjusting an automatic exposure setting of the camera based on the determining of whether the perceived scene change in the preview is caused at least in part by the environmental reflection of light from the display screen.

2. The method of claim 1, wherein the automatic exposure setting of the camera comprises one or more of an aperture of a lens of the camera, an analog gain of the camera, a digital gain of the camera, or a shutter speed of the camera prior to or during image capture.

3. The method of claim 1, further comprising:
detecting, based on sensor data from an ambient light sensor on the mobile device, a change in an environmental brightness measurement, and
wherein the determining of whether the perceived scene change in the preview is caused at least in part by the environmental reflection of light from the display screen is based on the detected change in the environmental brightness measurement.

4. The method of claim 3, wherein the ambient light sensor is a spectral sensor configured to detect a flicker, or light spectrum, or both.

5. The method of claim 3, wherein the mobile device comprises a front-side comprising the display screen, and a rear-side opposite from the front-side, and wherein the ambient light sensor is a rear-facing sensor located on the rear-side of the mobile device.

6. The method of claim 1, wherein the adjusting of the automatic exposure setting is configured to reduce an exposure oscillation of the preview of the image, wherein the exposure oscillation comprises a plurality of alternating changes of the preview between bright and dark brightness settings.

7. The method of claim 1, wherein the determining of whether the perceived scene change in the preview is caused at least in part by the environmental reflection of light from the display screen comprises determining whether the perceived scene change is primarily caused by motion in image data or a luma change.

8. The method of claim 7, further comprising:
determining that the perceived scene change is primarily caused by the luma change, and
wherein the adjusting of the automatic exposure setting comprises decreasing a rate of exposure change for the camera.

9. The method of claim 8, wherein the determining that the perceived scene change is primarily caused by the luma change comprises using a green/clear channel comprising a ratio of green responsivity to clear responsivity to determine a luma value.

10. The method of claim 8, wherein the determining that the perceived scene change is primarily caused by the luma change comprises associating monotonic luma change with an environmental brightness measurement resulting from the environmental reflection of light from the display screen.

11. The method of claim 7, further comprising:
determining that the perceived scene change is primarily caused by motion in the image data, and
wherein the adjusting of the automatic exposure setting comprises increasing or maintaining a rate of exposure change for the camera.

12. The method of claim 11, wherein the determining that the perceived scene change is primarily caused by the motion in the image data comprises evaluating the motion between sequential frames in the image data.

13. The method of claim 11, wherein the determining that the perceived scene change is primarily caused by the motion in the image data comprises determining a motion mean over a time window.

14. The method of claim 11, wherein the determining that the perceived scene change is primarily caused by the motion in the image data comprises determining a motion variance over a time window.

15. The method of claim 11, wherein determining that the perceived scene change is primarily caused by the motion in the image data comprises determining that the perceived scene change is primarily caused by a motion of the mobile device.

16. The method of claim 15, wherein the motion of the mobile device is determined using a gyroscope.

17. The method of claim 1, wherein the adjusting of the automatic exposure setting comprises increasing or maintaining a rate of exposure change of the camera when an environmental brightness measurement is above a threshold brightness level.

18. The method of claim 1, wherein adjusting of the automatic exposure setting comprises determining a slow down rate when the perceived scene change is determined to primarily result from the environmental reflection of light from the display screen.

19. A mobile device, comprising:
- a camera comprising a display screen;
- one or more processors; and
- data storage, wherein the data storage has stored thereon computer-executable instructions that, when executed by the one or more processors, cause the mobile device to carry out functions comprising:
  - displaying, by the display screen, a preview of an image;
  - determining whether a perceived scene change in the preview is caused at least in part by an environmental reflection of light from the display screen; and
  - adjusting an automatic exposure setting of the camera based on the determining of whether the perceived scene change in the preview is caused at least in part by the environmental reflection of light from the display screen.

20. A non-transitory computer-readable medium comprising program instructions executable by one or more processors to cause the one or more processors to perform operations comprising:
- displaying, by a display screen of a camera of a mobile device, a preview of an image;
- determining whether a perceived scene change in the preview is caused at least in part by an environmental reflection of light from the display screen; and
- adjusting an automatic exposure setting of the camera based on the determining of whether the perceived scene change in the preview is caused at least in part by the environmental reflection of light from the display screen.

* * * * *